(12) United States Patent
Wang

(10) Patent No.: US 8,218,823 B2
(45) Date of Patent: Jul. 10, 2012

(54) DETERMINING MAIN OBJECTS USING RANGE INFORMATION

(75) Inventor: Sen Wang, Rchester, NY (US)

(73) Assignee: Eastman Kodak Company, Rochester, NY (US)

( * ) Notice: Subject to any disclaimer, the term of this patent is extended or adjusted under 35 U.S.C. 154(b) by 526 days.

(21) Appl. No.: 12/539,139

(22) Filed: Aug. 11, 2009

(65) Prior Publication Data

US 2011/0038509 A1  Feb. 17, 2011

(51) Int. Cl.
*G06K 9/00* (2006.01)
*G01C 3/08* (2006.01)
(52) U.S. Cl. .................. 382/106; 382/291; 356/4.03
(58) Field of Classification Search .............. 382/100, 382/103, 106–107, 117–118, 155, 165–168, 382/173, 181, 190–195, 199, 203, 209, 216, 382/219–224, 232, 254, 260, 274, 276, 286–298, 382/305, 312; 356/4.03
See application file for complete search history.

(56) References Cited

U.S. PATENT DOCUMENTS

| | | | |
|---|---|---|---|
| 4,101,217 A | 7/1978 | Fergg et al. | |
| 4,707,119 A | 11/1987 | Terashita | |
| 4,945,406 A | 7/1990 | Cok | |
| 4,984,013 A | 1/1991 | Terashita | |
| 5,016,043 A | 5/1991 | Kraft et al. | |
| 6,243,133 B1 | 6/2001 | Spaulding et al. | |
| 6,252,976 B1 | 6/2001 | Schildkraut et al. | |
| 6,275,605 B1 | 8/2001 | Gallagher et al. | |
| 6,282,317 B1 | 8/2001 | Luo et al. | |
| 6,573,932 B1 | 6/2003 | Adams, Jr. et al. | |
| 6,636,646 B1 | 10/2003 | Gindele | |
| 6,845,181 B2 | 1/2005 | Dupin et al. | |
| 6,873,743 B2 | 3/2005 | Steinberg | |
| 7,035,461 B2 * | 4/2006 | Luo et al. ................ | 382/167 |
| 7,043,090 B2 | 5/2006 | Gindele et al. | |
| 7,046,400 B2 | 5/2006 | Gindele et al. | |
| 7,116,838 B2 * | 10/2006 | Gindele et al. ........... | 382/260 |
| 7,129,980 B1 | 10/2006 | Ashida | |
| 7,158,174 B2 | 1/2007 | Gindele et al. | |
| 7,162,102 B2 * | 1/2007 | Cahill et al. ............. | 382/288 |

(Continued)

FOREIGN PATENT DOCUMENTS

WO   WO 2008/102296 A2   8/2008

(Continued)

OTHER PUBLICATIONS

A. Hoover et al.: "An Experimental Comparison of Range Image Segmentation Algorithms", IEEE Transactions on Pattern Analysis and Machine Intelligence, IEEE Service Center, Los Alamitos, CA, US LNKD-DOI:10.1109/34.506791, vol. 18, No. 7, Jul. 1, 1996, pp. 673-689, XP002213073, ISSN: 0162-8828, p. 674; Table 1.

(Continued)

*Primary Examiner* — Seyed Azarian
(74) *Attorney, Agent, or Firm* — Kevin E. Spaulding

(57) ABSTRACT

A system and method for identifying a main object in a digital image using range information includes receiving the digital image representing a scene; identifying range information associated with the digital image and including distances of pixels in the scene from a known reference location; identifying the main object in the digital image based at least upon an analysis of the range information and the digital image; and storing an indication of the identified main object in a processor-accessible memory system.

20 Claims, 4 Drawing Sheets

U.S. PATENT DOCUMENTS

| | | |
|---|---|---|
| 7,212,668 B1 * | 5/2007 | Luo et al. .................. 382/165 |
| 7,230,538 B2 | 6/2007 | Lai et al. |
| 7,263,220 B2 * | 8/2007 | Crandall et al. ............. 382/165 |
| 7,289,154 B2 | 10/2007 | Gindele |
| 7,333,654 B2 | 2/2008 | Luo et al. |
| 7,421,149 B2 | 9/2008 | Haynes et al. |
| 7,421,418 B2 | 9/2008 | Nakano |
| 7,526,127 B2 | 4/2009 | Koide et al. |
| 7,844,076 B2 * | 11/2010 | Corcoran et al. ............. 382/103 |
| 2002/0126893 A1 | 9/2002 | Held et al. |
| 2003/0007687 A1 | 1/2003 | Nesterov et al. |
| 2003/0044063 A1 | 3/2003 | Meckes et al. |
| 2003/0044070 A1 | 3/2003 | Fuersich et al. |
| 2003/0044178 A1 | 3/2003 | Oberhardt et al. |
| 2003/0223622 A1 | 12/2003 | Simon et al. |
| 2004/0240749 A1 | 12/2004 | Miwa et al. |
| 2005/0157204 A1 | 7/2005 | Marks |
| 2007/0121094 A1 * | 5/2007 | Gallagher et al. .......... 356/4.03 |
| 2007/0126921 A1 | 6/2007 | Gallagher et al. |
| 2007/0274604 A1 | 11/2007 | Schechner et al. |
| 2008/0112616 A1 | 5/2008 | Koo et al. |

FOREIGN PATENT DOCUMENTS

WO    WO 2009/072070 A1    6/2009

OTHER PUBLICATIONS

"Dominant Sets and Pairwise Clustering", by Massimiliano Pavan et al., IEEE Transactions on Pattern Analysis & Machine Intelligence, vol. 29, No. 1, Jan. 2007, pp. 167-172.

"Object Detection using a Max-Margin Hough Transform" by S. Maji et al., Proc. IEEE Conf. on Computer Vision and Pattern Recognition, 2009.

"Object-Specific Figure-Ground Segregation" by S. X. Yu, et al., Proc. Iee Conf. on Computer Vision and Pattern Recognition, 2003.

"Object Segmentation Using Graph Cuts Based Active Contours" by N. Xu et al., Proc. IEEE Conf. on Computer Vision and Pattern Recognition, 2003.

"Attentional Scene Segmentation: Integrating Depth and Motion", Computer Vision and Image Understanding (78), No. 3, Jun. 2000, pp. 351-373.

* cited by examiner

DETERMINING MAIN OBJECTS USING RANGE INFORMATION

CROSS-REFERENCE TO RELATED APPLICATIONS

Reference is made to commonly assigned, co-pending U.S. patent application Ser. No. 11/510,431 filed Jul. 28, 2009, entitled: "Detection of Objects Using Range Information", by S. Wang, commonly assigned, co-pending U.S. patent application Ser. No. 12/511,111 filed Jul. 29, 2009, entitled: "Adjusting Perspective and Disparity in Stereoscopic Image Pairs", by S. Wang, and commonly assigned, co-pending U.S. patent application Ser. No. 12/533,325 filed Jul. 31, 2009, entitled: "Digital Image Brightness Adjustment Using Range Information", by S. Wang, which are incorporated herein by reference.

FIELD OF THE INVENTION

This invention relates to an object detection method for digital images, and more particularly to a method for identifying main objects using range information.

BACKGROUND OF THE INVENTION

Many applications in digital imaging require the identification of objects in a digital image or video. For example, in the motion picture industry, it may be desirable to identify objects (e.g., actors or props) in an individual frame of a motion picture, and then to manipulate the pixel values of the identified main object to apply a desired special effect. The main object identification process is generally accomplished manually and typically requires manually outlining the object (s) of interest using a graphic user interface on a computer terminal. The image pixels for the identified objects are then modified by changing the objects with respect to the background in some predetermined manner. Alternately, it may be desirable to apply image modifications to the background. For example, in recent motion pictures the effects of blurring the background or changing the background to black and white have been used.

This manual object identification process is very labor intensive and hence costly to implement. Yet, the effect is so desirable that motion picture producers are willing to invest the expense to produce images having desired special effects. Of course, special effects are also desirable for use in still photograph by amateur or professional photographers. Such use is similarly limited by the cost and inconvenience of a manual object identification technique.

In the case where amateur photographers desire to apply special effects to still digital images, there is not only the manual labor required to manipulate the digital image, but also the effort needed to learn to use software that is capable of doing the manual object selection. If such image manipulation is not done regularly, the user has a certain amount of re-learning to do each time they desire to manipulate an image.

There are many references that describe techniques for identifying main objects in digital images. For example, a method for determining main objects in a photograph is described in U.S. Pat. No. 6,282,317, and methods for emphasis of main objects is described in U.S. Pat. Nos. 7,333,654 and 7,212,668. However, they only use information from two-dimensional digital images. Furthermore, their results are highly sensitive to image noise.

Consequently, a need exists in the art for an automated method of processing a digital image having reliably identified main objects in order to enable various image processing operations.

SUMMARY OF THE INVENTION

The present invention represents a method for identifying main objects in digital images, the method implemented at least in part by a data processing system and comprising:
receiving a digital image representing a scene;
identifying range information associated with the digital image and including distances of pixels in the scene from a known reference location;
identifying at least one main object in the digital image based at least upon an analysis of the range information and the digital image; and
storing an indication of the identified at least one main object in a processor-accessible memory system.

It is an advantage of the present invention that by using range information the main objects can be determined with improved accuracy and reliability.

BRIEF DESCRIPTION OF THE DRAWINGS

The present invention will be more readily understood from the detailed description of exemplary embodiments presented below considered in conjunction with the attached drawings, of which.

DETAILED DESCRIPTION

The present invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular and/or plural in referring to the "method" or "methods" and the like is not limiting.

The phrase, "digital content record", as used herein, refers to any digital content record, such as a digital still image, a digital audio file, a digital video file, etc.

It should be noted that, unless otherwise explicitly noted or required by context, the word "or" is used in this disclosure in a non-exclusive sense.

Figure 1:
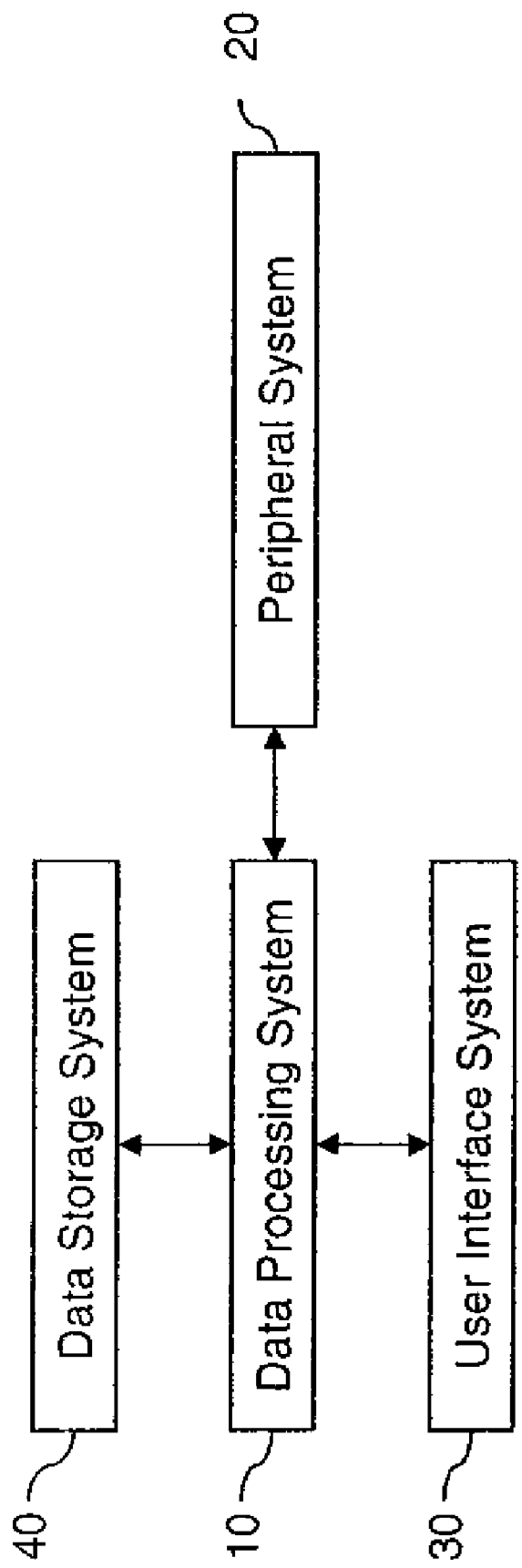
FIG. 1 is a high-level diagram showing the components of a system for determining main objects in a digital image according to an embodiment of the present invention.

FIG. 1 is a high-level diagram showing the components of a system for determining main objects in a digital image according to an embodiment of the present invention. The system includes a data processing system 10, a peripheral system 20, a user interface system 30, and a data storage system 40. The peripheral system 20, the user interface system 30 and the data storage system 40 are communicatively connected to the data processing system 10.

Figure 2:
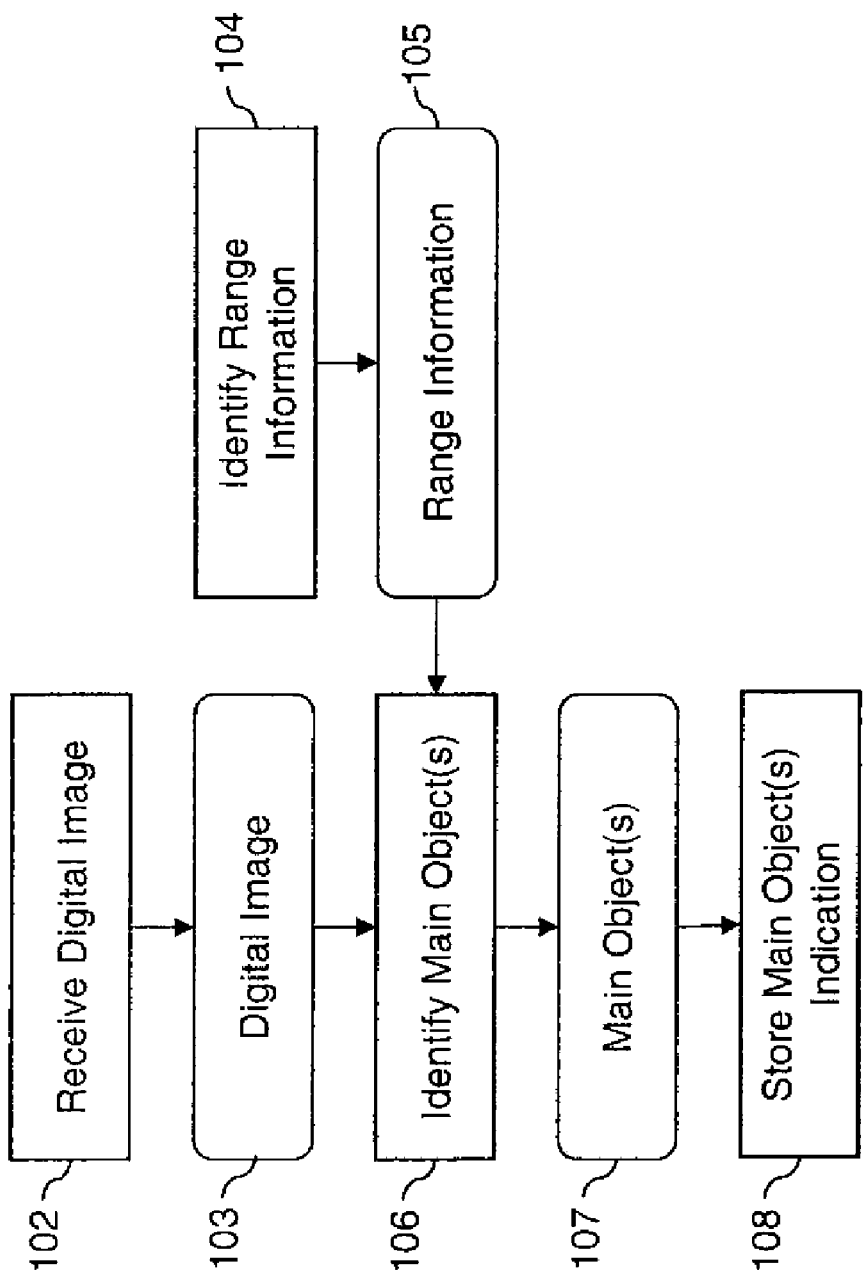
FIG. 2 is a flowchart illustrating a method for determining main objects in a digital image according to an embodiment of the present invention.
Figure 3:
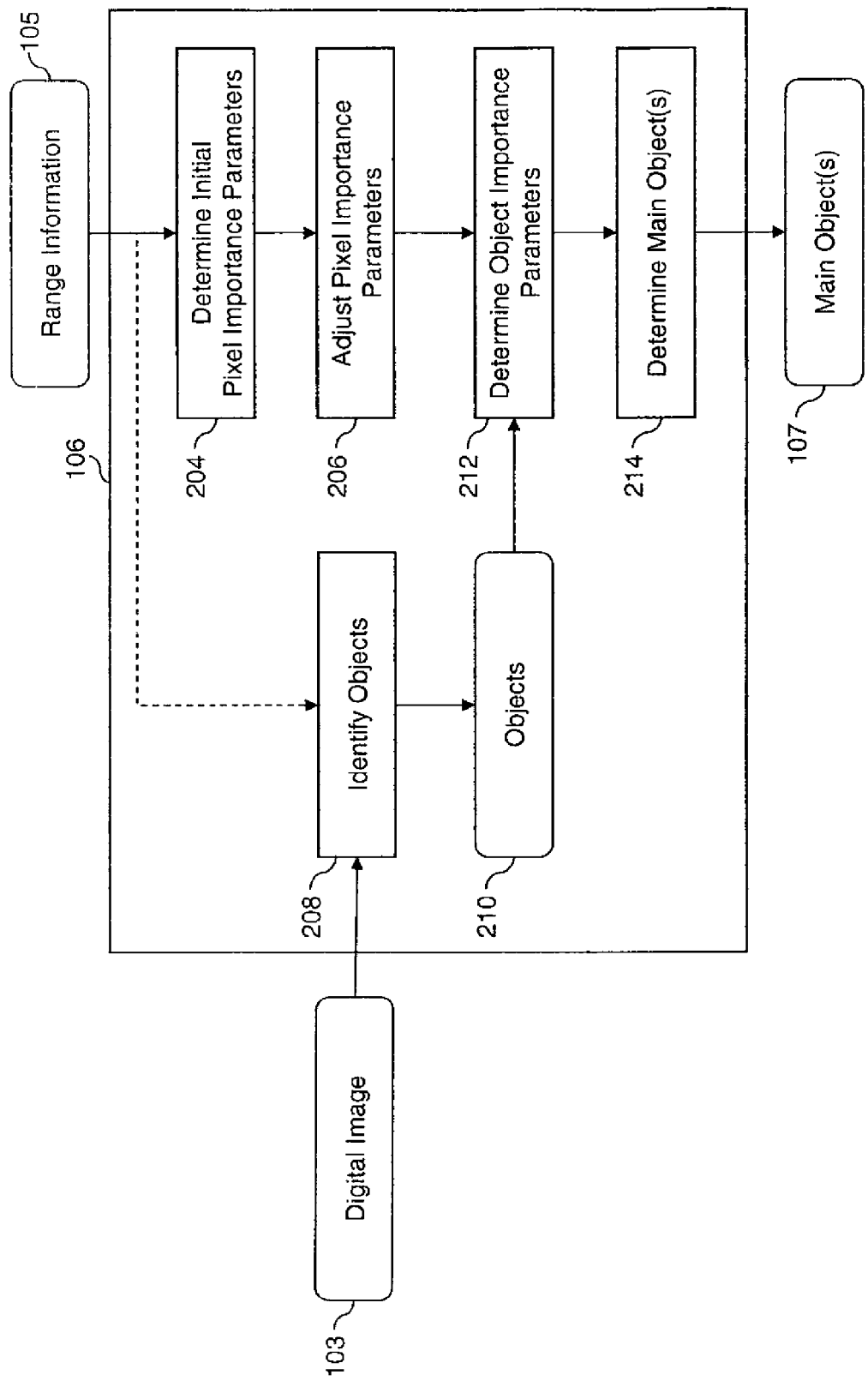
FIG. 3 is a flowchart illustrating additional details for the identify main object step shown in FIG. 2.
Figure 4:
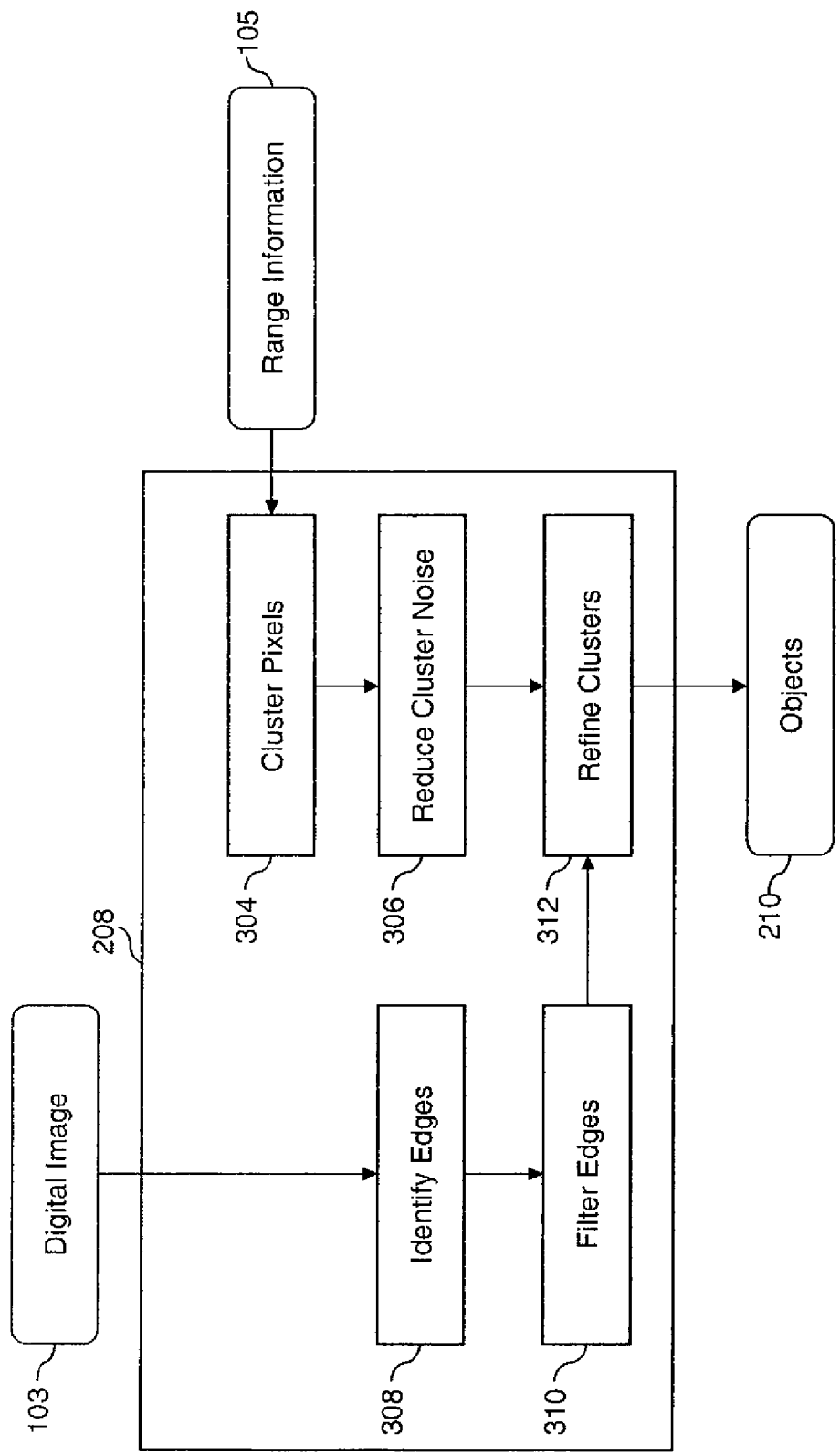
FIG. 4 is a flowchart illustrating additional details for the identify objects step shown in FIG. 3.

The data processing system 10 includes one or more data processing devices that implement the processes of the various embodiments of the present invention, including the example processes of FIGS. 2-4 described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic optical, biological components, or otherwise.

The data storage system 40 includes one or more processor-accessible memories configured to store information, including the information needed to execute the processes of the various embodiments of the present invention, including the example processes of FIGS. 2-4 described herein. The data storage system 40 may be a distributed processor-accessible memory system including multiple processor-accessible memories communicatively connected to the data processing system 10 via a plurality of computers and/or devices. On the other hand, the data storage system 40 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. Further, the phrase "communicatively connected" is intended to include connections between devices or programs within a single data processor, connections between devices or programs located in different data processors, and connections between devices not located in data processors at all. In this regard, although the data storage system 40 is shown separately from the data processing system 10, one skilled in the art will appreciate that the data storage system 40 may be contained completely or partially within the data processing system 10. Further in this regard, although the peripheral system 20 and the user interface system 30 are shown separately from the data processing system 10, one skilled in the art will appreciate that one or both of such systems may be stored completely or partially within the data processing system 10.

The peripheral system 20 may include one or more devices configured to provide digital content records to the data processing system 10. For example, the peripheral system 20 may include digital still cameras, digital video cameras, cellular phones, or other data processors. The data processing system 10, upon receipt of digital content records from a device in the peripheral system 20, may store such digital content records in the data storage system 40.

The user interface system 30 may include a mouse, a keyboard, another computer, or any device or combination of devices from which data is input to the data processing system 10. In this regard, although the peripheral system 20 is shown separately from the user interface system 30, the peripheral system 20 may be included as part of the user interface system 30.

The user interface system 30 also may include a display device, a processor-accessible memory, or any device or combination of devices to which data is output by the data processing system 10. In this regard, if the user interface system 30 includes a processor-accessible memory, such memory may be part of the data storage system 40 even though the user interface system 30 and the data storage system 40 are shown separately in FIG. 1.

FIG. 2 is a flow diagram illustrating a method for determining main objects in a digital image according to an embodiment of the present invention. A digital image 103 representing a scene is received in receive digital image step 102. The digital image 103 can be captured by a digital camera or a scanner. Alternately, it may be a frame of a video sequence captured by a video camera.

Range information 105 associated with the digital image 103 is identified in identify range information step 104. The range information 105 includes distances of pixels in the scene from a known reference location. The viewpoint location needs to be identified relative to the given range information. Usually, the viewpoint location is the reference location. Range information 105 is preferably presented in the form of a range map provided by a ranging camera which uses visible light, infrared light, laser light or ultrasound to determine distances to pixels in the scene. Alternately, the range map can be provided using stereoscopic image processing techniques that involve capturing images of a scene from multiple viewpoints and determining the range information by evaluating the relative positions of objects in the scene. For cases where the range map has different dimensions (i.e., number of rows and columns) than the digital image 103, the range map is preferably interpolated so that it has the same dimensions.

Next, identify main object(s) step 106 is used to identify and label one or more main object(s) 107 based at least upon an analysis of the range information 105 and the digital image 103. The main object(s) 107 are identified from a plurality of objects that are detected and segmented in the digital image 103. More details of the identify main object(s) step 106 will be described below with reference to FIG. 3. In store main object indication step 108, indications of the identified main object(s) 107 are stored in a processor-accessible memory system.

FIG. 3 is a flowchart illustrating additional details for the identify main object(s) step 106 shown in FIG. 2 according to a preferred embodiment of the present invention. The digital image 103 and the range information 105 are provided as inputs. In determine initial pixel importance parameters step 204, pixel importance parameters are determined response to the range information 105.

In one embodiment of the present invention, range information 105 comprising a range map is used to group pixels of the digital image into distance layers based at least on an analysis of the distances from the viewpoint stored in a range map, wherein each distance layer represents points in the scene at a similar distance from the viewpoint. This can be accomplished by generating pixel distances clusters using a clustering algorithm such as a method described in "Dominant Sets and Pairwise Clustering" (IEEE Transactions on Pattern Analysis & Machine Intelligence, Vol. 29, No. 1, January 2007, pp. 167-172). The pixels in the digital image can then be grouped into distance layers based at least upon an analysis of the pixel distance clusters. In a preferred embodiment of the present invention, each pixel distance cluster corresponds to a different distance layer.

Next, initial pixel importance parameter values are assigned to each pixel responsive to the distance layer, wherein pixels in the same distance layer are given the same initial pixel importance-parameter value. Pixels in distance layers closer to the viewpoint are given a preferred (e.g., higher) initial pixel importance parameter value as compared to pixels in distance layers that are further from the viewpoint. This reflects the fact that objects closer to the viewpoint will be more likely to be main objects.

An adjust pixel importance parameters step 206, is used to adjust the initial pixel importance parameter values of each pixel in the digital image to determine adjusted pixel importance parameter values for each pixel in the digital image 103. In a preferred embodiment of the present invention, the pixel importance parameter values are adjusted responsive to the location of the pixel within the digital image and a local edge gradient.

Pixels having a more central location within the digital image are given a preferred adjusted pixel importance parameter value as compared to pixels in the same distance layer having a less central location within the digital image. This reflects the fact that main objects are likely to be closer to the center of the image.

Similarly, pixels located at or near image locations having a high local edge gradient are given a preferred adjusted pixel importance parameter value as compared to pixels in the same distance layer located at or near image locations having a lower local edge gradient. The local edge gradient vector of an image can be calculated by:

$$[G_x, G_y] = \nabla I = \left[ \frac{\partial I}{\partial x}, \frac{\partial I}{\partial y} \right]$$

where I(x, y) is the intensity of pixel at location (x, y). The magnitude of the local edge gradient vector is:

$$G = [G_x^2 + G_y^2]^{1/2}.$$

This reflects the fact that main objects are likely to contain image detail rather than being areas of constant brightness.

In a preferred embodiment of the present invention the adjusted pixel importance parameter value, $P_a(x, y)$, for each pixel can be calculated according to the following equation:

$$P_a(x,y) = K_P(x,y) K_G(x,y) P_i(x,y).$$

where $P_i(x, y)$ is the initial pixel importance parameter value, $K_P(x, y)$ is a position adjustment factor, $K_G(x, y)$ is a gradient adjustment factor and (x, y) is the pixel position.

There are many functional forms that could be used for the position adjustment factor and the gradient adjustment factor. In one embodiment of the present invention, the position adjustment factor has the form:

$$K_P(x,y) = (1 - (r/r_{max})^{n_p})$$

where r is the distance from the pixel to the center of the image, $r_{max}$ is the distance from the center of the image to the corner of the image, and $n_p$ is a constant. In this example, the position adjustment factor will have a value of one in the center of the image and will fall off to a value of zero in the corners of the image.

Similarly, the gradient adjustment factor can take the form:

$$K_G(x,y) = (G/G_{max})^{n_g}$$

where G is the magnitude of the local edge gradient vector, $G_{max}$ is the maximum magnitude of the local edge gradient vector in the image, and $n_g$ is a constant. In this example, the gradient adjustment factor will have a value of one in the image region having the highest level of detail and will fall off to a value of zero in flat image regions.

In identify objects step 208, a segmentation method is used to segment the digital image 103 into a plurality of different objects 210. One example segmentation method is described in "Attentional Scene Segmentation: Integrating Depth and Motion", Computer Vision and Image Understanding (78), No. 3, June 2000, pp. 351-373. Details of one embodiment of the identify objects step 208 that can be used in accordance with the present invention will be described below with reference to FIG. 4.

In determine object importance parameters step 212, object importance parameters are determined for each of the identified objects 210 responsive to the adjusted pixel importance-parameter values. In a preferred embodiment of the present invention, the object importance parameters are determined by averaging the adjusted pixel importance-parameter values for the pixels contained within each of the identified objects 210. This can be expressed in equation form as:

$$W_k = \frac{1}{n} \sum_{i,j \in object\ k}^{n} w(i, j)$$

where $W_k$ is the object importance parameter for the $k^{th}$ detected object, w(i, j) is the adjusted pixel importance-parameter value of the pixel in location (i, j), and n is the number of pixels in the $k^{th}$ detected object.

The object importance parameter can be further adjusted in response to one or more additional image analysis operations. Examples of additional image analysis operations include skin detection, face detection, or person detection. If skin, faces of people were detected in any of the identified objects 210, the value of the corresponding object importance parameter could be increased accordingly to reflect the fact that such objects are more likely to be main objects.

In determine main object(s) step 214, at least one main object 107 is determined in response to the object importance parameter values. In a preferred embodiment of the present inventions, the object importance parameter values for each of the identified objects 210 are sorted, and the objects with the largest object importance parameter values are determined to be main objects 107. In some cases, only the object 210 with the largest object importance parameter value may be identified as a main object. In other cases, multiple main objects may be identified. In such cases, a user can specify a certain number of main objects that should be identified, or alternatively, objects whose object importance parameter values are sufficiently close to the maximum object importance parameter value can be identified as main objects.

FIG. 4 is a flowchart illustrating additional details for the identify objects step 208 shown in FIG. 3 according to an embodiment of the present invention. A digital image 103 and range information 105 including a range map are provided as discussed earlier. In cluster pixels step 304, pixels in the range map are clustered by using a clustering algorithm such as the method described in "Dominant Sets and Pairwise Clustering" (IEEE Transactions on Pattern Analysis & Machine Intelligence, Vol. 29, No. 1, January 2007, pp. 167-172). The cluster groups generated in this manner typically have a lot of noise. Reduce cluster noise step 306 is used to reduce the cluster noise using a morphological method to fill small holes and remove small cluster regions.

Edges are detected in the digital image 103 using an identify edges step 308. In a preferred embodiment of the present invention, the edges are identified using an edge gradient operation. The calculations for the edge gradient of an image were discussed earlier.

Next, filter edges step 310 is used to filter the detected edges to remove insignificant edges and keep the significant edges. Mathematically, the filtering operation can be expressed as:

$$E = f \times e,$$
$$f = \begin{cases} 0 & \text{if } (S(e) \leq T) \\ 1 & \text{if } (S(e) > T), \end{cases}$$

where e is one of the detected edges, S(e) is the sum of gradient magnitudes of each pixels in the edge e, f is a filter mask and T is the threshold.

The pixel clusters produced by the reduce cluster noise step 306 will typically still have errors in the boundary areas because of the noise in the range map. A refine clusters step 312 is used refine the cluster groups and produce cluster map. The boundary of cluster groups are refined by using the significant edges computed in the filter edges step 310. If pixels are outside of the detected significant edges in each cluster group, they will be removed. This will make the boundaries of the cluster groups much more accurate. Each of the refined cluster groups will then be identified as an object 210.

Once one or more main objects have been determined in accordance with the present invention, this information can be used for many different applications. For example, various image processing algorithms can be used to modify pixels in the digital image corresponding to the identified main objects in order to apply image enhancements or special affects. Alternately, the identified main objects can be used in conjunction with other processes for purposes such as object recognition and image organization.

It is to be understood that the exemplary embodiments disclosed herein are merely illustrative of the present invention and that many variations of the above-described embodiments can be devised by one skilled in the art without departing from the scope of the invention. It is therefore intended that all such variations be included within the scope of the following claims and their equivalents.

PARTS LIST

10 Data processing system
20 Peripheral system
30 User interface system
40 Data storage system
102 Receive digital image step
103 Digital image
104 Identify range information step
105 Range information
106 Identify main object(s) step
107 Main object(s)
108 Store main object indication step
204 Determine initial pixel importance parameters step
206 Adjust pixel importance parameters step
208 Identify objects step
210 Objects
212 Determine object importance parameters step
214 Determine main object(s) step
304 Cluster pixels step
306 Reduce cluster noise step
308 Identify edges step
310 Filter edges step
312 Refine clusters step

What is claimed is:

1. A method for identifying main objects in digital images, the method implemented at least in part by a data processing system and comprising:
receiving a digital image representing a scene, the digital image being captured from a viewpoint;
identifying range information associated with the digital image and including distances of pixels in the scene from a known reference location;
identifying a plurality of objects in the digital image;
identifying at least one main object in the digital image based at least upon an analysis of the range information and the digital image, wherein the at least one main object is identified from the plurality of objects; and
storing an indication of the identified at least one main object in a processor-accessible memory system;
wherein the step of identifying of the at least one main object includes;
determining object importance parameters for each of the plurality of objects, wherein objects closer to the viewpoint are given preferred object importance parameter values as compared to objects that are further from the viewpoint and have a similar pixel location within the digital image, and wherein objects that have a more central pixel location within the digital image are given preferred object-importance parameter values as compared to objects that have a less central pixel location within the digital image and are at a similar distance from the viewpoint; and
identifying at least one of the plurality of objects to be a main object responsive to the object importance parameters for the plurality of objects.

2. The method of claim 1 further including adjusting the object importance parameters in response to one or more additional image analysis operations.

3. The method of claim 2 wherein the one or more additional image analysis operations include skin detection, face detection or person detection.

4. The method of claim 1 wherein the step of identifying of the at least one main object further includes:
associating a distance from a viewpoint with each pixel in the digital image based at least upon an analysis of the range information;
grouping pixels of the digital image into distance layers based at least on an analysis of the distances from the viewpoint, wherein each distance layer represents points in the scene at a similar distance from the viewpoint;
associating an initial pixel importance parameter value with each pixel in the digital image, wherein pixels in the same distance layer are given the same initial pixel importance parameter value;
identifying a plurality of objects in the digital image, each object being comprised of a plurality of pixels;
determining an object importance parameter for each object in the digital image responsive to the pixel importance parameter values of the pixels in each object; and
identifying the at least one main object responsive to the object importance parameter values.

5. The method of claim 4 further including the step of adjusting the initial pixel importance parameter value of each pixel in the digital image to determine an adjusted pixel importance parameter value for each pixel responsive to the location of the pixel within the digital image and a local edge gradient.

6. The method of claim 5 wherein pixels having a more central location within the digital image are given preferred adjusted pixel importance parameter values as compared to pixels having a less central location within the digital image.

7. The method of claim 5 wherein pixels located at or near image locations having a high local edge gradient are given preferred adjusted pixel importance parameter values as compared to pixels located at or near image locations having a lower local edge gradient.

8. The method of claim 4 wherein the object importance parameter for an object is determined by averaging the pixel importance parameters of the pixels in that object.

9. The method of claim 4 wherein the step of grouping pixels of the digital image into distance layers includes:
generating pixel distance clusters based at least upon an analysis of the distances from the viewpoint; and
grouping pixels of the digital image into distance layers based at least upon an analysis of the pixel distance clusters.

10. The method of claim 9 wherein each distance layer corresponds to a pixel distance cluster.

11. The method of claim 4 wherein pixels representing points closer to the viewpoint are given preferred initial pixel importance parameter values as compared to pixels representing points that are further from the viewpoint.

12. The method of claim 1 wherein the range information is received from a ranging camera that senses distances of pixels in the scene from a known reference location using visible light, inferred light, ultrasound or laser light.

13. The method of claim 1 wherein the range information is determined by analyzing at least two images of the scene captured from multiple viewpoints.

14. The method of claim 1 wherein the digital image is captured by a digital camera or a digital scanner.

15. The method of claim 1 further including the step of forming a modified digital image by modifying pixels in the digital image corresponding to the identified main objects.

16. The method of claim 15 wherein the pixels in the digital image corresponding to the identified main objects are modified using an image enhancement algorithm or a special effects algorithm.

17. A computer program product stored on a non-transitory computer-readable medium to perform the steps of:
receiving a digital image representing a scene, the digital image being captured from a viewpoint;
identifying range information associated with the digital image and including distances of pixels in the scene from a known reference location;
identifying a plurality of objects in the digital image;
identifying at least one main object in the digital image based at least upon an analysis of the range information and the digital image, wherein the at least one main object is identified from the plurality of objects; and
storing an indication of the identified at least one main object in a processor-accessible memory system;
wherein the step of identifying of the at least one main object includes;
determining object importance parameters for each of the plurality of objects, wherein objects closer to the viewpoint are given preferred object importance parameter values as compared to objects that are further from the viewpoint and have a similar pixel location within the digital image, and wherein objects that have a more central pixel location within the digital image are given preferred object-importance parameter values as compared to objects that have a less central pixel location within the digital image and are at a similar distance from the viewpoint; and
identifying at least one of the plurality of objects to be a main object responsive to the object importance parameters for the plurality of objects.

18. A system comprising:
a data processing system; and
a memory system communicatively connected to the data processing system and storing instructions configured to cause the data processing system to implement a method for identifying main objects in digital images, wherein the instructions comprise:
receiving a digital image representing a scene, the digital image being captured from a viewpoint;
identifying range information associated with the digital image and including distances of pixels in the scene from a known reference location;
identifying a plurality of objects in the digital image;
identifying at least one main object in the digital image based at least upon an analysis of the range information and the digital image; and
storing an indication of the identified at least one main object in a processor-accessible memory system,
wherein the step of identifying of the at least one main object includes;
determining object importance parameters for each of the plurality of objects, wherein objects closer to the viewpoint are given preferred object importance parameter values as compared to objects that are further from the viewpoint and have a similar pixel location within the digital image, and wherein objects that have a more central pixel location within the digital image are given preferred object-importance parameter values as compared to objects that have a less central pixel location within the digital image and are at a similar distance from the viewpoint; and
identifying at least one of the plurality of objects to be a main object responsive to the object importance parameters for the plurality of objects.

19. The system of claim 18 further including a ranging camera that provides the range information by sensing distances of pixels in the scene from a known reference location using visible light, inferred light, ultrasound or laser light.

20. The method of claim 18 further including a digital camera or a digital scanner for capturing the digital image representing the scene.

* * * * *

UNITED STATES PATENT AND TRADEMARK OFFICE
CERTIFICATE OF CORRECTION

PATENT NO. : 8,218,823 B2  
APPLICATION NO. : 12/539139  
DATED : July 10, 2012  
INVENTOR(S) : Sen Wang Page 1 of 1

It is certified that error appears in the above-identified patent and that said Letters Patent is hereby corrected as shown below:

| Column | Line | |
|---|---|---|
| 9 | 21 | In claim 12, delete "inferred" and insert --infrared-- |
| 10 | 48 | In claim 19, delete "inferred" and insert --infrared-- |

Signed and Sealed this  
Twenty-fifth Day of September, 2012

David J. Kappos  
*Director of the United States Patent and Trademark Office*